United States Patent
Panchaksharaiah et al.

(10) Patent No.: US 11,785,287 B2
(45) Date of Patent: Oct. 10, 2023

(54) SYSTEMS AND METHODS FOR CONTROLLING ACCESS FROM A FIRST CONTENT PLATFORM TO CONTENT ITEMS AVAILABLE ON A SECOND CONTENT PLATFORM

(71) Applicant: Rovi Guides, Inc., San Jose, CA (US)

(72) Inventors: Vishwas Sharadanagar Panchaksharaiah, Tiptur (IN); Vikram Makam Gupta, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/381,676

(22) Filed: Jul. 21, 2021

(65) Prior Publication Data
US 2021/0352360 A1    Nov. 11, 2021

Related U.S. Application Data

(63) Continuation of application No. 16/433,646, filed on Jun. 6, 2019, now Pat. No. 11,102,542.

(51) Int. Cl.
| | |
|---|---|
| *H04N 21/43* | (2011.01) |
| *H04N 21/438* | (2011.01) |
| *H04N 21/488* | (2011.01) |
| *H04N 21/45* | (2011.01) |
| *H04N 21/442* | (2011.01) |
| *H04N 21/845* | (2011.01) |

(Continued)

(52) U.S. Cl.
CPC ....... *H04N 21/4383* (2013.01); *H04N 21/442* (2013.01); *H04N 21/4532* (2013.01); *H04N 21/4668* (2013.01); *H04N 21/4825* (2013.01); *H04N 21/4882* (2013.01); *H04N 21/84* (2013.01); *H04N 21/8456* (2013.01)

(58) Field of Classification Search
CPC ............ H04N 21/4383; H04N 21/442; H04N 21/4532; H04N 21/4668; H04N 21/4825; H04N 21/4882; H04N 21/84; H04N 21/8456

See application file for complete search history.

(56) References Cited

U.S. PATENT DOCUMENTS 6,810,527 B1 * 10/2004 Conrad .............. H04N 21/6193
 725/77
7,921,440 B1 *  4/2011 Koide ................ H04N 21/4755
 348/460

(Continued)

*Primary Examiner* — Timothy R Newlin
(74) *Attorney, Agent, or Firm* — Haley Guiliano LLP

(57) ABSTRACT

Systems and methods are described herein for controlling access from a first content platform to content items available on a second content platform to which a user will temporarily have access in the near future. The first content platform identifies a period of time during which the user will have access to the second content platform and determines an access duration of the period of time. The first content platform retrieves a plurality of content identifiers of content items that will be available on the second content platform during the period of time. Upon receiving selection of a content identifier, the first content platform determines a duration of the content item corresponding to the selected content identifier and generates for display the content item. The first content platform then reduces the access duration by an amount of time equal to the duration of the content item.

18 Claims, 8 Drawing Sheets

(51) Int. Cl.
*H04N 21/466* (2011.01)
*H04N 21/482* (2011.01)
*H04N 21/84* (2011.01)

(56) References Cited

U.S. PATENT DOCUMENTS

| | | | |
|---|---|---|---|
| 8,677,502 B2* | 3/2014 | Hanson | H04N 21/4627 709/227 |
| 10,944,803 B1* | 3/2021 | Johnston, Jr. | H04L 51/046 |
| 11,102,542 B2 | 8/2021 | Panchaksharaiah et al. | |
| 2005/0066353 A1* | 3/2005 | Fransdonk | H04N 21/2541 348/E7.056 |
| 2008/0133705 A1* | 6/2008 | Lemond | H04B 7/18506 709/217 |
| 2008/0141314 A1* | 6/2008 | Lemond | H04W 36/023 725/76 |
| 2009/0260032 A1* | 10/2009 | Li | H04N 21/84 725/39 |
| 2010/0138865 A1* | 6/2010 | Rai | H04N 21/4314 725/44 |
| 2010/0223660 A1* | 9/2010 | Scott | H04N 21/8355 726/4 |
| 2011/0126246 A1* | 5/2011 | Thomas | H04N 21/25825 725/93 |
| 2014/0006616 A1* | 1/2014 | Aad | G06F 21/552 709/225 |
| 2014/0215022 A1* | 7/2014 | Baset | H04L 67/32 709/219 |
| 2014/0258865 A1* | 9/2014 | Papish | G06F 3/0486 715/719 |
| 2014/0298169 A1* | 10/2014 | Williams | G06Q 50/10 715/716 |
| 2015/0039680 A1* | 2/2015 | Gallant | H04L 12/1457 709/231 |
| 2017/0018002 A1* | 1/2017 | Champy | G06Q 30/0241 |
| 2017/0195319 A1* | 7/2017 | Gerber | G06Q 20/34 |
| 2017/0302711 A1* | 10/2017 | Velayudhan | H04N 21/2146 |
| 2018/0241759 A1* | 8/2018 | Solow | H04L 63/107 |
| 2018/0374171 A1* | 12/2018 | Aizen | G06Q 10/107 |
| 2019/0014371 A1* | 1/2019 | Couleaud | H04N 21/431 |
| 2019/0020543 A1* | 1/2019 | Asnis | H04B 10/1143 |
| 2020/0288204 A1* | 9/2020 | Duersch | H04N 21/251 |
| 2020/0389696 A1* | 12/2020 | Panchaksharaiah | H04N 21/442 |
| 2021/0076099 A1* | 3/2021 | Ganschow | G06F 21/44 |
| 2021/0316186 A1* | 10/2021 | Armour | H04N 21/6543 |
| 2021/0400512 A1* | 12/2021 | Agarwal | H04M 7/0078 |

* cited by examiner

200
```
Access Token {
  Token ID: 014a3d7692c00e7b
  Initial Duration: 12:15
  Consumed: 2:16
  Remaining Duration: 9:59
}
```
- 202 → Token ID: 014a3d7692c00e7b
- 204 → Initial Duration: 12:15
- 206 → Consumed: 2:16
- 208 → Remaining Duration: 9:59

FIG. 2

300
```
Access Token {
  Token ID: 014a3d7692c00e7b
  Total Duration: 12:15
  Category_Action {
    Initial Duration: 6:15
    Consumed: 2:16
    Remaining Duration: 3:59
  }
  Category_Drama {
    Initial Duration: 4:00
    Consumed: 0:00
    Remaining Duration: 4:00
  }
  Category_Comedy {
    Initial Duration: 2:00
    Consumed: 0:00
    Remaining Duration: 2:00
  }
}
```
- 302 → Total Duration: 12:15
- 304 → Category_Action
  - 304a → Initial Duration: 6:15
  - 304b → Consumed: 2:16
  - 304c → Remaining Duration: 3:59
- 306 → Category_Drama
  - 306a → Initial Duration: 4:00
  - 306b → Consumed: 0:00
  - 306c → Remaining Duration: 4:00
- 308 → Category_Comedy
  - 308a → Initial Duration: 2:00
  - 308b → Consumed: 0:00
  - 308c → Remaining Duration: 2:00

FIG. 3

400
```
Access Token {
  Token ID: 014a3d7692c00e7b
  Total Duration: 12:15
  Category_1080p {
    Initial Duration: 6:15
    Consumed: 2:16
    Remaining Duration: 3:59
  }
  Category_4K {
    Initial Duration: 4:00
    Consumed: 0:00
    Remaining Duration: 4:00
  }
  Category_720p {
    Initial Duration: 2:00
    Consumed: 0:00
    Remaining Duration: 2:00
  }
}
```
- 402 → Category_1080p
- 404 → Category_4K
- 406 → Category_720p

FIG. 4

SYSTEMS AND METHODS FOR CONTROLLING ACCESS FROM A FIRST CONTENT PLATFORM TO CONTENT ITEMS AVAILABLE ON A SECOND CONTENT PLATFORM

CROSS-REFERENCE TO RELATED APPLICATIONS

This application is a continuation of U.S. patent application Ser. No. 16/433,646, filed Jun. 6, 2019, which is hereby incorporated by reference herein in its entireties.

BACKGROUND

The present disclosure relates to content delivery and consumption platforms and, more particularly, allowing and tracking access from a first content platform to content available from a second content platform to which a user of the first content platform will have access in the near future.

SUMMARY

When looking for content to watch, users often refer to recommendations provided by a content platform. Traditionally, content platforms provide recommendations based on a user's past viewing history, specified user preferences, or some combination thereof. In some cases, a first content platform may have access to user data indicating temporary access to a second content platform for a limited time in the near future, such as an entertainment system on an airplane. Content available on the second content platform may include content items that are not currently available on the first content platform. User equipment of the second content platform, such as airplane entertainment systems, generally has limited video and audio capabilities, and the user may wish to consume content available on the second content platform on his or her home user equipment which provides a higher quality entertainment experience. Due to the temporary nature of the user's access, however, a provider of the second content platform may allow the user to view only a certain amount of content matching or commensurate with the duration of the user's future access. What is needed is a way for the provider of the second content platform to control and track access to content available on the second content platform, to prevent the user from exceeding his or her allotted content access.

Systems and methods are described herein for controlling access from a first content platform to content items available on a second content platform to which the user will temporarily have access in the near future. The first content platform identifies a period of time during which a user will have access to the second content platform. The first content platform then determines an access duration of the period of time. For example, a flight may have a scheduled duration of ten hours, but an entertainment system available on the flight not be activated until fifteen minutes after takeoff and may be deactivated fifteen minutes prior to landing. Thus, the access duration is only nine hours and thirty minutes. The first content platform retrieves a plurality of content identifiers of content items that will be available on the second content platform during the period of time. The content identifiers may be displayed to the user along with other content recommendations. The first content platform receives a selection of a content identifier of the plurality of content identifiers, determines a duration of the content item corresponding to the selected content identifier, and generates for display the content item. The first content platform then reduces the access duration by an amount of time equal to the duration of the content item. For example, if the access duration is nine hours and thirty minutes, and the user selects a content item from the second content platform having a duration of one hour and fifteen minutes, the first content platform reduced the access duration to seven hours and forty-five minutes.

Before generating the content item for display, the first content platform may compare the duration of the content item to the access duration and determine whether the duration of the content item exceeds the access duration. If the duration of the content item exceeds the access duration, the first content platform generates for display an alert that the duration of the content item exceeds the access duration.

The access duration may be divided into different portions corresponding to different types of content, such as level of video resolution or content genre. The first content platform identifies a content type of the content item and reduces the portion of the access duration corresponding to the identified content type. The access duration may be retrieved by the first content platform as part of an access token. The access token may also store the length of content consumed by the user and the remaining duration. When updating the access token, the first content platform may add the duration of the content item to the length of content consumed by the user in order to calculate a new remaining duration. The first content platform then replaces the remaining duration in the access token with the new remaining duration. In addition to retrieving the access token, the first content platform may retrieve a temporary license from the second content platform for the user to consume the content item.

The first content platform may retrieve content identifiers only for those content items available on the second content platform that are not also available on the first content platform. The first content platform identifies a plurality of content items that will be available on the second content platform during the period of time and determines whether each respective content item is currently available on the first content platform. If a content item is not currently available on the first content platform, a content identifier corresponding to the particular content item is retrieved.

In cases where the first content platform retrieves content identifiers for all content items available on the second content platform, the first content platform may reduce the access duration only if the selected content item is not also available on the first content platform. If the selected content item is available on both the first content platform and the second content platform, the first content platform may automatically access the copy available on the first content platform. Alternatively, the first content platform may generate an alert that the selected content item is available on both content platforms and may prompt the user to confirm from which platform the content item should be accessed.

The first content platform may access calendar data of the user to determine the period of time during which the user will have access to the second content platform. The first content platform identifies, from the calendar data, a departure time from a first location and an arrival time at a second location and determines the period of time as the period of time between the departure time and the arrival time. The first content platform may also identify a transportation carrier associated with the calendar data, such as an airline. The first content platform then determines whether a content platform other than the first content platform will be available during the period of time. For example, the first content platform queries a server associated with an identified airline to determine if an entertainment system will be available on the user's flight.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an example of an access token retrieved from a second content platform by a first content platform, in accordance with some embodiments of the disclosure;

FIG. 3 shows a second example of an access token retrieved from a second content platform by a first content platform, in accordance with some embodiments of the disclosure;

FIG. 4 shows a third example of an access token retrieved from a second content platform by a first content platform, in accordance with some embodiments of the disclosure;

DETAILED DESCRIPTION

Figure 1:
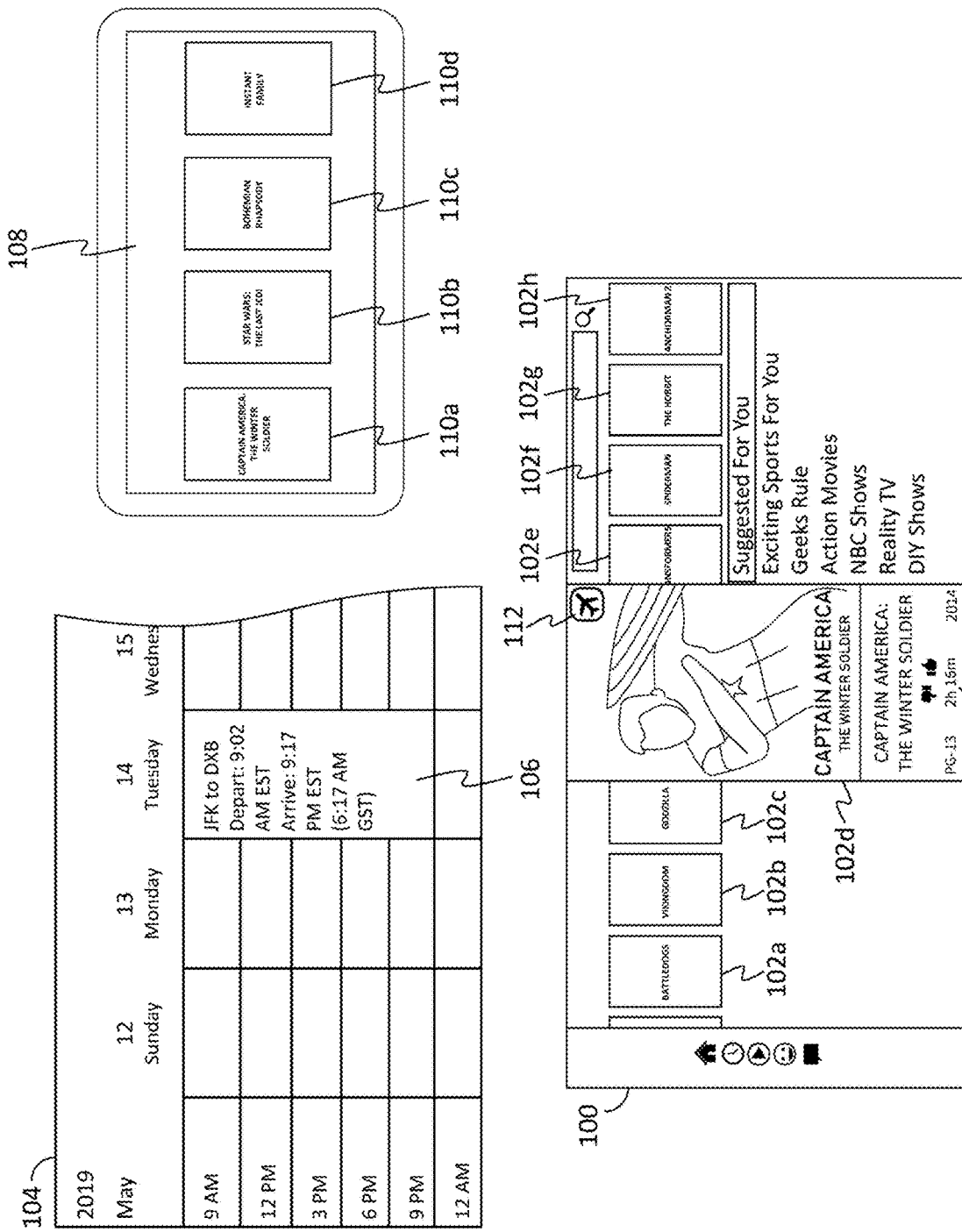
FIG. 1 shows a generalized embodiment of a content platform on which a recommendation engine may be employed, in accordance with some embodiments of the disclosure.

FIG. 1 shows a generalized embodiment of a first content platform on which a recommendation engine may be employed and a second content platform from which the first content platform may retrieve content, in accordance with some embodiments of the disclosure. First content platform 100 is available to the user in his or her home or on his or her mobile device. First content platform 100 provides content recommendations 102a-102h for content items available on content platform 100 which may be of interest to the user. For example, first content platform 100 may compare characteristics or attributes (e.g., genre, actors) of content items previously watched by the user with characteristics or attributes of other available content items to identify content items with matching (i.e., similar) characteristics or attributes. First content platform 100 may also access calendar data 104 associated with a profile of the user. Calendar data 104 may include travel information 106, such as a scheduled airline flight. Upon detecting the travel information, first content platform 100 identifies a second content platform 108 that will be available to the user during travel. First content platform 100 retrieves content identifiers of content items 110a-110d available on the second content platform 108. In some embodiments, first content platform 100 compares the content items available on second content platform 108 with content items available on the first content platform 100 and retrieves content identifiers only for content items that are available only on second content platform 108. A visual indicator 112 may be overlaid over an image or link (e.g., content identifier 102d) corresponding to content items available on the second content platform 108. Content identifier 102d may also include the duration 114 of the corresponding content item. If the user selects a content identifier corresponding to a content item available only on second content platform 108 (e.g., content identifier 102d), first content platform 100 determines whether the user has a sufficiently long access duration to consume the content item by comparing the length of the content item 114 to the access duration. If so, first content platform 100 retrieves or streams the content item from second content platform 108 and generates the content item for display to the user. First content platform 100 also updates an access duration corresponding to the period of time during which the user will have access to second content platform 108, reducing the length of content the user will be allowed to access (i.e., the access duration) by the duration 114 of the selected content item, or the length of a portion of the selected content item actually consumed by the user.

To allow access to the second content platform, the first content platform retrieves an access token from the second content platform. FIG. 2 shows an example of an access token 200 containing a token ID 202, an initial duration 204, a consumption counter 206 for the length of content consumed by the user, and a remaining duration 208. For example, travel information 106 indicates a flight from JFK to Dubai with a scheduled flight time of twelve hours and fifteen minutes. Initial duration 204 reflects this amount of time. As the user consumes content from second content platform 108, first content platform 100 updates the consumption counter 206. First content platform 100 recalculates the remaining duration by subtracting the value of the consumption counter from the initial duration to obtain a new remaining duration. First content platform 100 updates the remaining duration to reflect the new remaining duration.

In some embodiments, the access duration is divided into portions for different types of content items. For example, FIG. 3 shows an access token 300 in which the total duration 302 is split among three categories 304, 306, and 308 based on a genre of content. The proportion by which the total duration 302 is assigned to each respective category is based on the average amount of content in each category consumed by users of the second content platform. Each category tracked in access token 300 has a respective initial duration (304a, 306a, 308a), consumption counter (304b, 306b, 308b), and remaining duration (304c, 306c, 308c).

The total duration may also be split among categories based on content quality (e.g., video resolution). As another example, FIG. 4 shows an access token 400 having categories for 1080p video 402, 4K video 404, and 720p video 406. Similar to access token 300, each category has a respective initial duration, consumption counter, and remaining duration. The first content platform identifies the category into which the selected content item falls and updates the respective consumption counter and remaining balance for that category using the same method described above.

Figure 5:
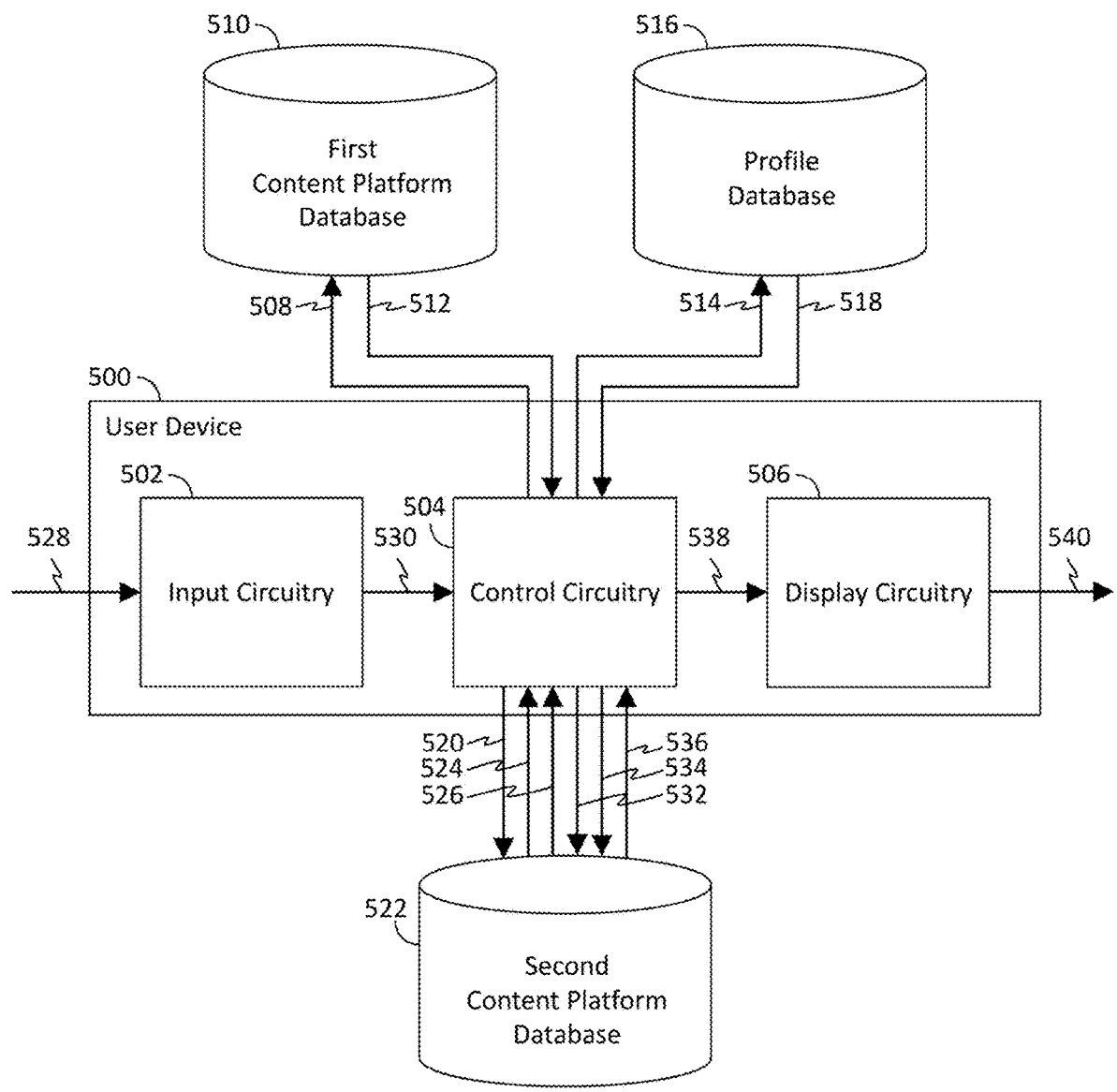
FIG. 5 is a block diagram representing control circuitry and data flow within a recommendation engine of the first content platform, in accordance with some embodiments of the disclosure.

FIG. 5 is a block diagram representing control circuitry and data flow within a user device 500 having access to the first content platform 100 in accordance with some embodiments of the disclosure. User device 500 includes input circuitry 502, control circuitry 504, and display circuitry 506. Input circuitry 502 may include a microphone and voice processing circuitry for receiving voice commands, infrared receiving circuitry for receiving commands from a remote control device, a touchscreen interface for receiving user interaction with graphical user interface elements, or any combination thereof or any other suitable input circuitry for receiving any other suitable user input. Control circuitry 504 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Input circuitry 502 may be integrated with control circuitry 504.

User device 500 may present content recommendations to the user. For example, control circuitry 504 may transmit a query 508 to a database 510 of the first content platform to identify available content items. Control circuitry 504 receives, in response to the query 508, a plurality of content identifiers 512 from the database 510 corresponding to available content items. Each of the plurality of content identifiers 512 may be displayed to the user using display circuitry 506. Control circuitry 504 also transmits a second query 514 to a profile database 516 for profile data associated with the user. In response to the second query 514, control circuitry 504 receives, from the profile database 516, user profile data 518 which may include calendar data (e.g., calendar data 104). If calendar data 104 indicates the user will be travelling in the near future, control circuitry 504 identifies from calendar data 104 a transportation carrier associated with the travel, such as an airline, and determines whether the transportation carrier provides access to a second content platform. If so, control circuitry 504 transmits a third query 520 to a database 522 of the second content platform 108 to identify content items available on the second content platform 108. In response to the third query 520, control circuitry 504 receives a second plurality of content identifiers 524. Like the first plurality of content identifiers 512, each of the second plurality of content identifiers 524 may be displayed to the user using display circuitry 506. In some embodiments, control circuitry 504 may compare the second plurality of content identifiers 524 to the first plurality of content identifiers 512 to determine which of the second plurality of content identifiers 524 is not also included in the first plurality of content identifiers 512. Control circuitry 504 then displays only those content identifiers of the second plurality of content identifiers 524 that are not also included in the first plurality of content identifiers 512. Control circuitry 504 may also overlay an icon or other visual indicator over content identifiers of the second plurality of content identifiers 524 to indicate that the corresponding content item is available only on the second content platform 108.

In addition to receiving the second plurality of content identifiers 524, control circuitry 504 also receives access token 526. Access token 526, which may be any one of access token 200, 300, or 400, includes an access duration, a consumption counter, which tracks the length of content from the second content platform 108 that the user has consumed, and a remaining duration, which reflects the difference between the access duration and the consumption counter.

User device 500 may receive, using input circuitry 502, input 528 selecting a content identifier. Input circuitry 502 processes input 528 to determine a command associated with input 528. The command 530 is then transmitted to control circuitry 504. In response to the command 530, control circuitry 504 determines whether the selected content identifier corresponds to a content item available on the second content platform 108. If the selected content identifier corresponds to a content item available on the second content platform 108, control circuitry transmits a request 532 to database 522 of the second content platform 108 to begin streaming the selected content item. Control circuitry also updates the remaining duration in access token 526 and transmits the updated access token 534 for storage in the database 522 of the second content platform 108. In response to request 532, control circuitry 504 receives selected content item 536 from database 522. Control circuitry 504 processes selected content item 536 and transmits 538 media data of selected content item 536 to display circuitry 506, which in turn outputs 540 the media data to a display.

Figure 6:
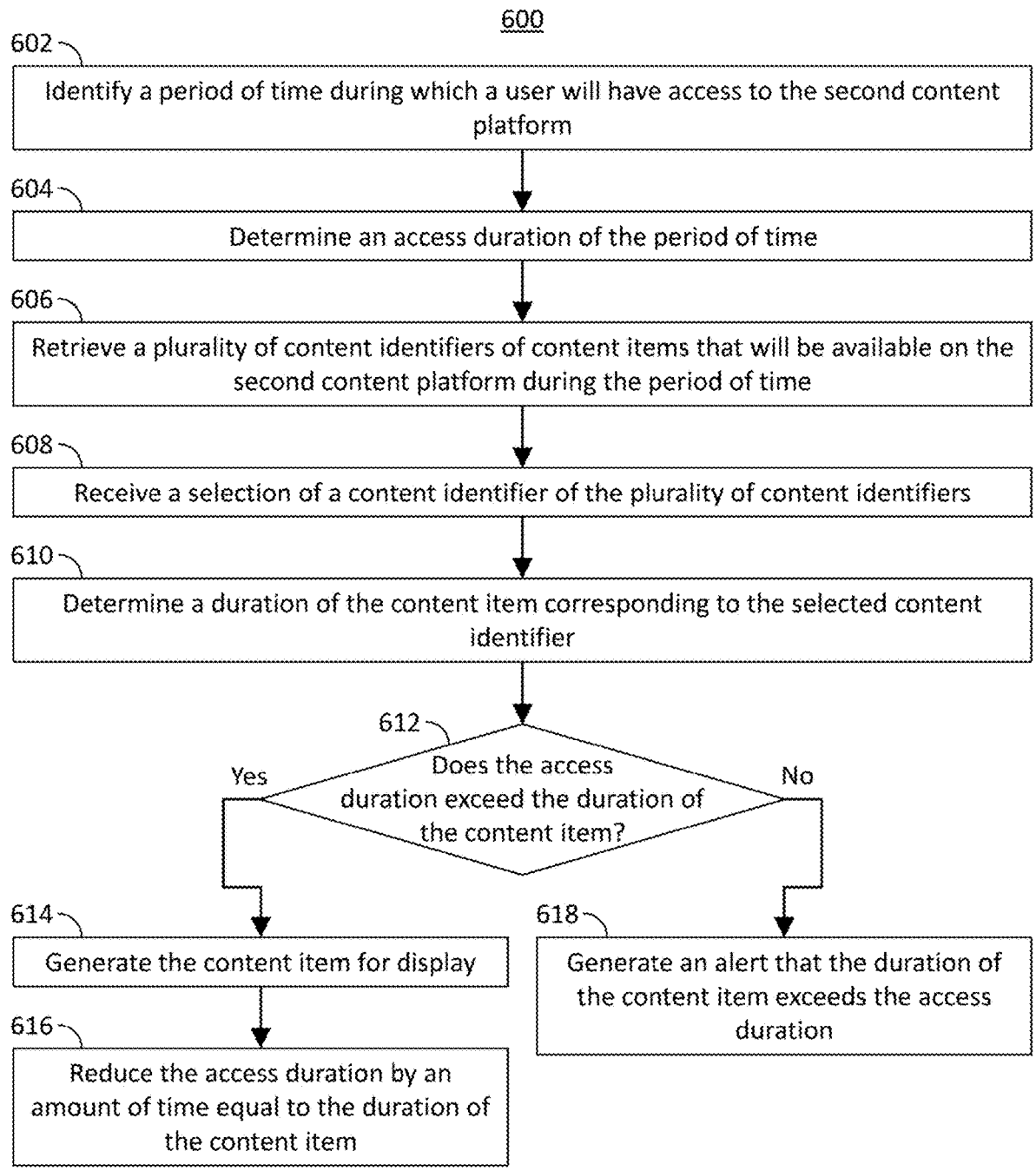
FIG. 6 is a flowchart representing a process for controlling and tracking, at a first content platform, access to content from a second content platform, in accordance with some embodiments of the disclosure.

FIG. 6 is a flowchart representing an illustrative process 600 for controlling and tracking, at a first content platform, access to content from a second content platform, in accordance with some embodiments of the disclosure. Process 600 may be implemented on control circuitry 504. In addition, one or more actions of process 600 may be incorporated into or combined with one or more actions of any other process or embodiment described herein.

At 602, control circuitry 504 identifies a period of time during which the user will have access to the second content platform 108 and, at 604, control circuitry 504 determines an access duration of the period of time. These actions may be accomplished using methods described below in connection with FIG. 12.

At 606, control circuitry 504 retrieves a plurality of content identifiers of content items that will be available on the second content platform 108 during the period of time. Control circuitry 504 may transmit a query (e.g., query 520) to a database of the second content platform 108 such as database 522. The query may be, for example, an SQL "SELECT" command or any other suitable type of database query. Control circuitry 504 receives, in response to the query, the plurality of content identifiers.

At 608, control circuitry 504 receives, via input circuitry 502, a selection of a content identifier of the plurality of content identifiers. For example, a command may be received from a remote control device or a touch interface device selecting a particular content identifier. Input circuitry 502 receives the command and relays it to control circuitry 504. Alternatively, input circuitry 502 may translate the received command into a machine-level command that can be recognized by control circuitry 504. Control circuitry 504 determines whether the selected content identifier corresponds to a content item available on the second content platform 108. For example, upon receiving the plurality of content identifiers, control circuitry 504 may tag each of the content identifiers of the plurality of content identifiers with a tag, such as a metadata field, indicating that the content into which the content identifier corresponds is available on the second content platform 108. Upon receiving the selection of a content identifier, control circuitry 504 may check this tag to determine whether the content item to which the selected content identifier corresponds is available on the second content platform 108 or the first content platform 100.

At 610, control circuitry 504 determines the duration of the content item corresponding to the selected content identifier. The content identifier may include metadata describing the corresponding content item and may include duration information. Alternatively, control circuitry 504 may transmit a query to database 522 requesting duration information for the content item corresponding to the selected content identifier.

At 612, control circuitry 504 determines whether the access duration exceeds the duration of the content item. For example, control circuitry compares the duration of the content item with the access duration or the remaining duration indicated in the access token. Control circuitry 504 may convert the time units in which the duration of the content item and/or the access duration or remaining duration are measured into a common time unit. For example, the access duration and/or remaining duration may be represented as a number of minutes, while the duration of the content item may be represented as a number of hours and a number of minutes. Control circuitry 504 converts the hours and minutes representing the duration of the content item to an equivalent number of minutes to facilitate the comparison. If the access duration exceeds the duration of the content item, then, at 614, control circuitry 504 generates the content item for display and, at 616, reduces the access duration or remaining duration by an amount of time equal to the duration of the content item. This may be accomplished using methods described below in connection with FIG. 8. If the access duration does not exceed the duration of the content item, then, at 618, control circuitry 504 generates an alert that the duration of the content item exceeds the access duration. Control circuitry 504 does not generate the content item for display.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
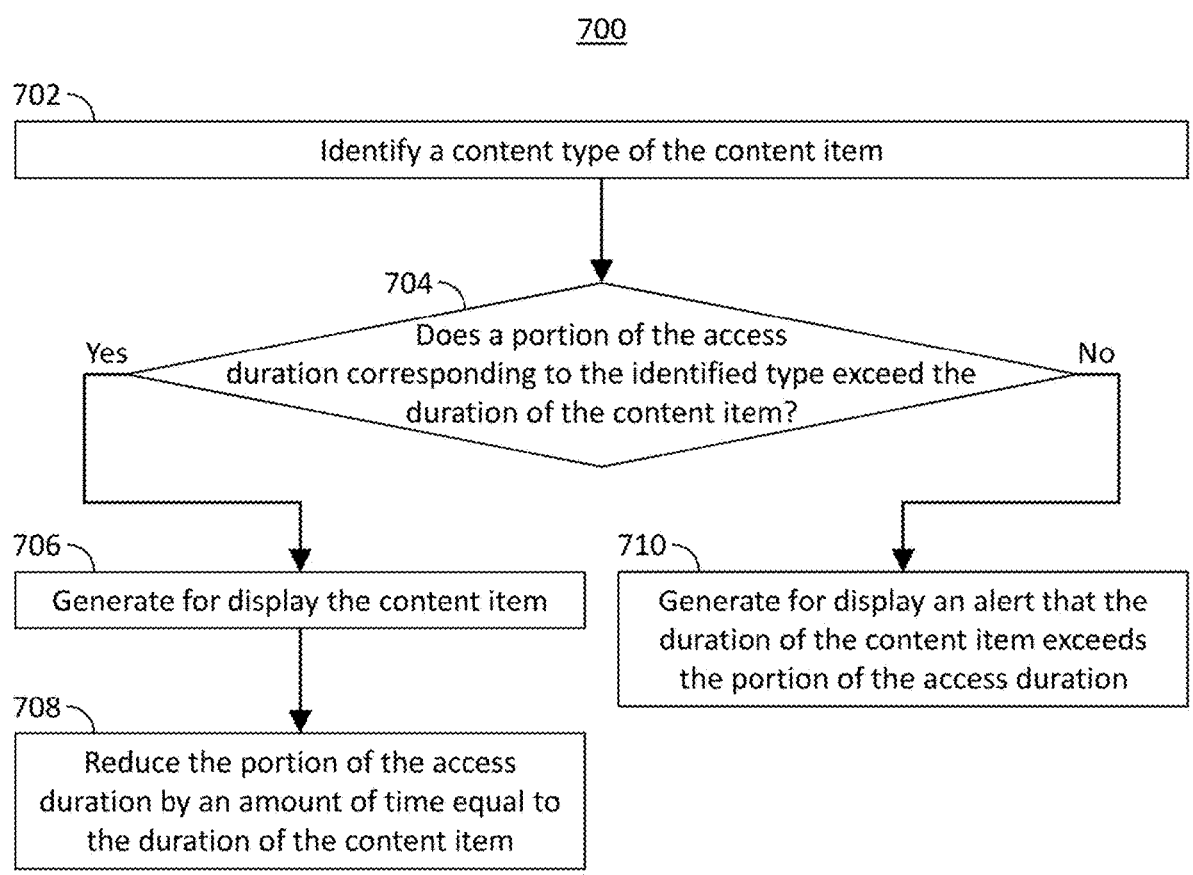
FIG. 7 is a flowchart representing a process for controlling and tracking access to types of content, in accordance with some embodiments of the disclosure.

FIG. 7 is a flowchart representing an illustrative process for controlling and tracking access to types of content, in accordance with some embodiments of the disclosure. Process 700 may be implemented on control circuitry 504. In addition, one or more actions of process 700 may be incorporated into or combined with one or more actions of any other process or embodiment described herein.

At 702, control circuitry 504 identifies a content type of the content item corresponding to the selected content identifier. The content type may be a genre (e.g., action, drama, comedy), rating (e.g., PG, PG-13, R, TV-Y, TV-MA), or quality level (e.g., 702p, 1080p, 4K). At 704, control circuitry 504 determines whether a portion of the access duration corresponding to the identified type exceeds the duration of the content item. As described above in connection with FIGS. 3 and 4, the access duration may be divided into portions associated with different types of content. The user may be authorized by the second content platform 108 to view only a certain length of content in each category, with the total length of content in all categories equaling the access duration. If the portion of the access duration corresponding to the identified content type exceeds the duration of the content item, then, at 706, control circuitry 504 generates for display the content item and, at 708, reduces the portion of the access duration by an amount equal to the duration of the content item. This may be accomplished using methods described below in connection with FIG. 8. If the portion of the access duration corresponding to the identified content type does not exceed the duration of the content item, then, at 710, control circuitry 504 generates an alert that that duration of the content item exceeds the portion of the access duration corresponding to the identified content type.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
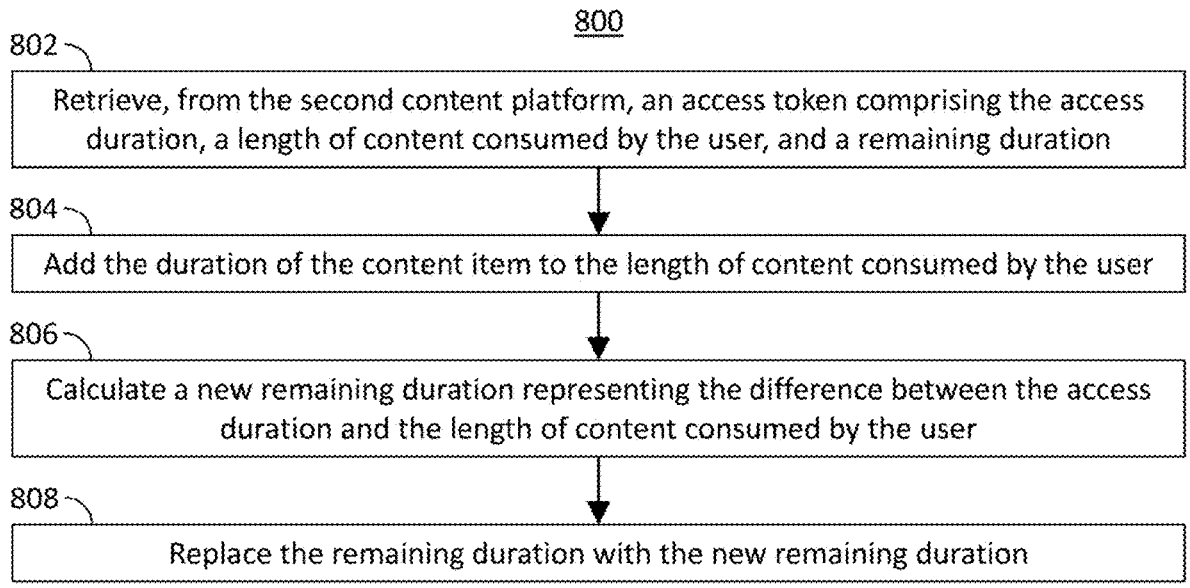
FIG. 8 is a flowchart representing a process for updating a remaining amount of an access duration, in accordance with some embodiments of the disclosure.

FIG. 8 is a flowchart representing an illustrative process 800 for updating a remaining amount of an access duration, in accordance with some embodiments of the disclosure. Process 800 may be implemented on control circuitry 504. In addition, one or more actions of process 800 may be incorporated into or combined with one or more actions of any other process or embodiment described herein.

At 802, control circuitry 504 retrieves, from the second content platform 108, an access token comprising the access duration, a length of content consumed by the user, and a remaining duration. Control circuitry 504 may retrieve the access token before, concurrently with, or after retrieving the plurality of content identifiers from database 522 of the second content platform 108.

At 804, control circuitry 504 adds the duration of the content item to the length of content consumed by the user. As described above, control circuitry 504 may convert the access duration of the content item and/or the consumption counter to the same time units, such as minutes, so that the two values can be added together. At 806, control circuitry 504 calculates a new remaining duration representing the difference between the access duration and the length of content consumed by the user. Control circuitry 504 subtracts the value of the consumption counter from the value of the access duration to obtain a new remaining duration. Alternatively, control circuitry 504 may subtract the duration of the content item from the remaining duration and assign the resulting difference as the new remaining duration. At 808, control circuitry 504 replaces the remaining duration with the new remaining duration. Control circuitry 504 updates the access token and may transmit the updated access token to the second content platform 108.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
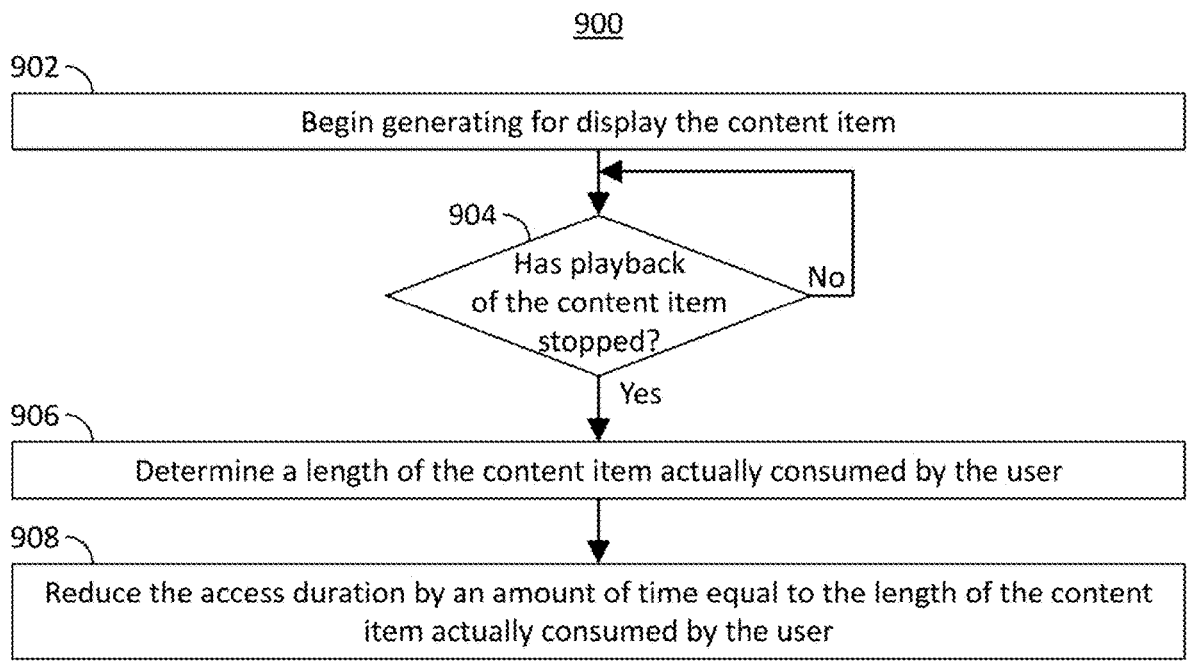
FIG. 9 is a flowchart representing a process for determining an amount by which to reduce a remaining amount of an access duration, in accordance with some embodiments of the disclosure.

FIG. 9 is a flowchart representing an illustrative process 900 for determining an amount by which to reduce a remaining amount of an access duration, in accordance with some embodiments of the disclosure. Process 900 may be implemented on control circuitry 504. In addition, one or more actions of process 900 may be incorporated into or combined with one or more actions of any other process or embodiment described herein.

In some embodiments, the access duration is reduced by the length of content actually consumed by the user, rather than by the entire duration of a selected content item. At 902, control circuitry 504 begins generating for display the content item. At 904, control circuitry 504 determines whether playback of the content item has stopped. Control circuitry 504 may check for receipt of a stop command, or whether playback has ended automatically after reaching the end of the content item. If playback has stopped, then. at 906, control circuitry 504 determines a length of the content item actually consumed by the user. Control circuitry 504 identifies a playback position at which playback of the content item ended. Control circuitry 504 then determines a length of content consumed between the start of the content item and the identified playback position. For example, control circuitry 504 may determine a time stamp of the content item corresponding to the identified playback position. Alternatively, control circuitry 504 may identify a frame number corresponding to the identified playback position and calculate, based on a known frame rate of the content item, the number seconds that have elapsed between the start of the content item and the identified playback position. At 908, control circuitry 504 reduces the access duration by an amount of time equal to the length of the content actually consumed by the user using methods described above in connection with FIG. 8.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
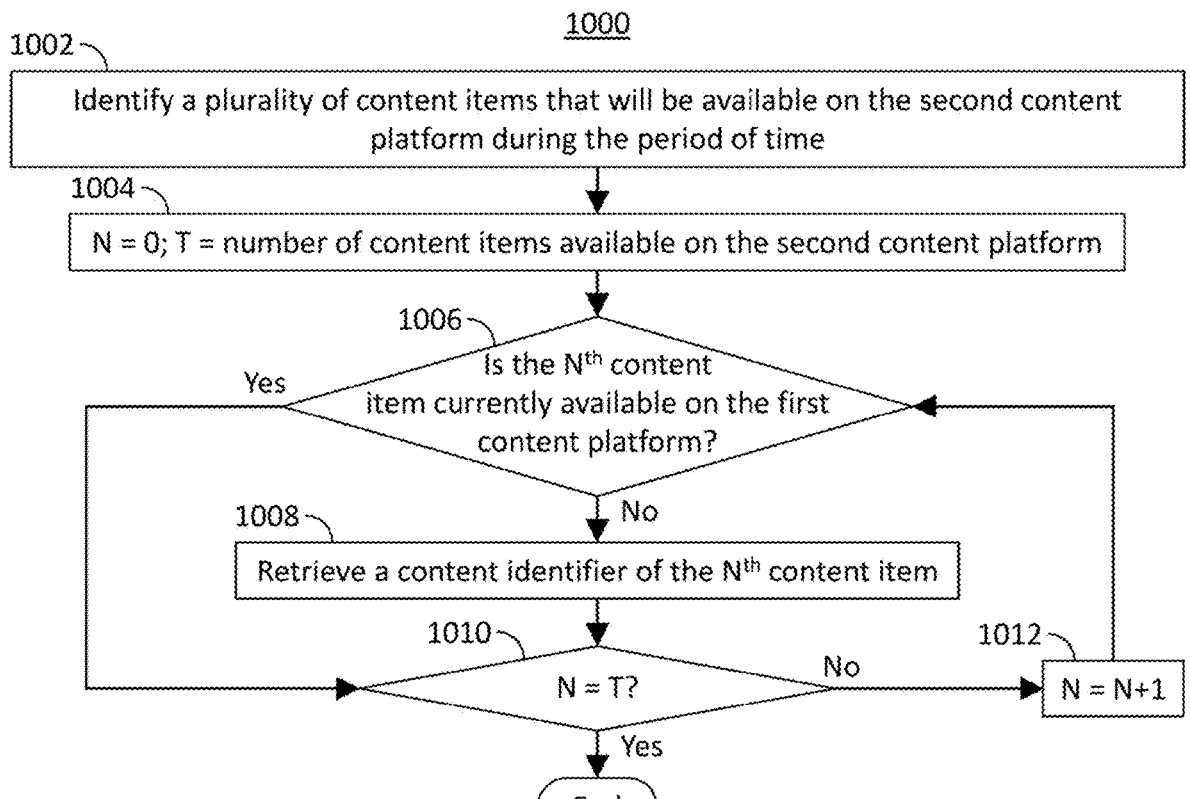
FIG. 10 is a flowchart representing a process for retrieving, by a first content platform, content identifiers from a second content platform, in accordance with some embodiments of the disclosure.

FIG. 10 is a flowchart representing an illustrative process 1000 for retrieving, by a first content platform, content identifiers from a second content platform, in accordance with some embodiments of the disclosure. Process 1000 may be implemented on control circuitry 504. In addition, one or more actions of process 1000 may be incorporated into or combined with one or more actions of any other process or embodiment described herein.

In some embodiments, content identifiers for only those content items available on the second content platform 108 and not also available on the first content platform 100 are retrieved. At 1002, control circuitry 504 identifies a plurality of content items that will be available on the second content platform during 108 the period of time. Control circuitry 504 may transmit a query to database 522 of the second content platform 108 such as an SQL "SELECT" command. At 1004, control circuitry 504 initializes a variable N and a variable T. N is a counter variable and control circuitry 504 sets its value to zero. T represents the total number of content items available on the second content platform 108 and control circuitry 504 sets its value accordingly by retrieving the total number of content items from database 522.

At 1006, control circuitry 504 determines whether the $N^{th}$ content item is currently available on the first content platform 100. Control circuitry 504 may compare metadata or other identifying information in the content identifier of the $N^{th}$ content item with a plurality of content identifiers corresponding to content items currently available on the first content platform 100. If the $N^{th}$ content item is not currently available on the first content platform 100, then, at 1008, control circuitry 504 retrieves the content identifier of the $N^{th}$ content item from database 522 of the second content platform 108. After retrieving the content identifier, or after determining that the $N^{th}$ content item is currently available on the first content platform 100, at 1010, control circuitry 504 compares the value of N with the value of T to determine if there are additional content items available on the second content platform 108. If N is not yet equal to T, then, at 1012, control circuitry 504 increments the value of N by one and processing returns to step 1006. This process repeats until N is equal to T, indicating that all content items available on the second content platform 108 have been compared with available content on the first content platform 100.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
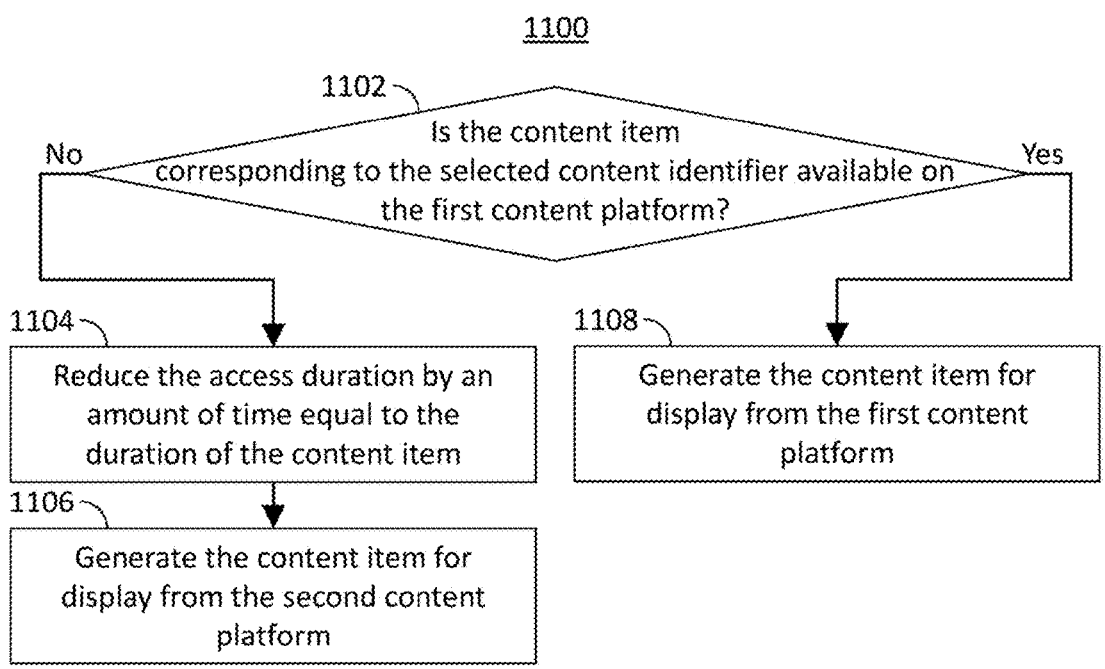
FIG. 11 is a flowchart representing a process for determining whether to reduce a remaining amount of an access duration in response to selection of a content item, in accordance with some embodiments of the disclosure.

FIG. 11 is a flowchart representing an illustrative process 1100 for determining whether to reduce a remaining amount of an access duration in response to selection of a content item, in accordance with some embodiments of the disclosure. Process 1100 may be implemented on control circuitry 504. In addition, one or more actions of process 1100 may be incorporated into or combined with one or more actions of any other process or embodiment described herein.

In some cases, a selected content identifier may correspond to a content item that is available on both the first content platform 100 and the second content platform 108. At 1102, control circuitry 504 determines whether the content item corresponding to the selected content identifier is available on the first content platform 100. For example, as described above, control circuitry 504 may tag content identifiers with an indication that the corresponding content item is available on the second content platform 108. Control circuitry 504 may, upon receiving selection of a content identifier, determine, based on the tag, that the corresponding content item is available on the second content platform and compare the content identifier with content identifiers corresponding to content items available on the first content platform 100. Control circuitry 504 may query database 510 for an entry matching the selected content identifier.

If control circuitry 504 determines that the content item is available only on the second content platform 108, then, at 1104, control circuitry 504 reduces the access duration by an amount of time equal to the duration of the content item. The may be accomplished using methods described above in connection with FIG. 8. At 1106, control circuitry 504 generates for display the content item from the second content platform. If control circuitry 504 determines that the content item is available only on the first content platform 100, or on both the first content platform 100 and the second content platform 108, then, at 1108, control circuitry 504 generates for display the content item from the first content platform 100, and does not reduce the access duration.

The actions and descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
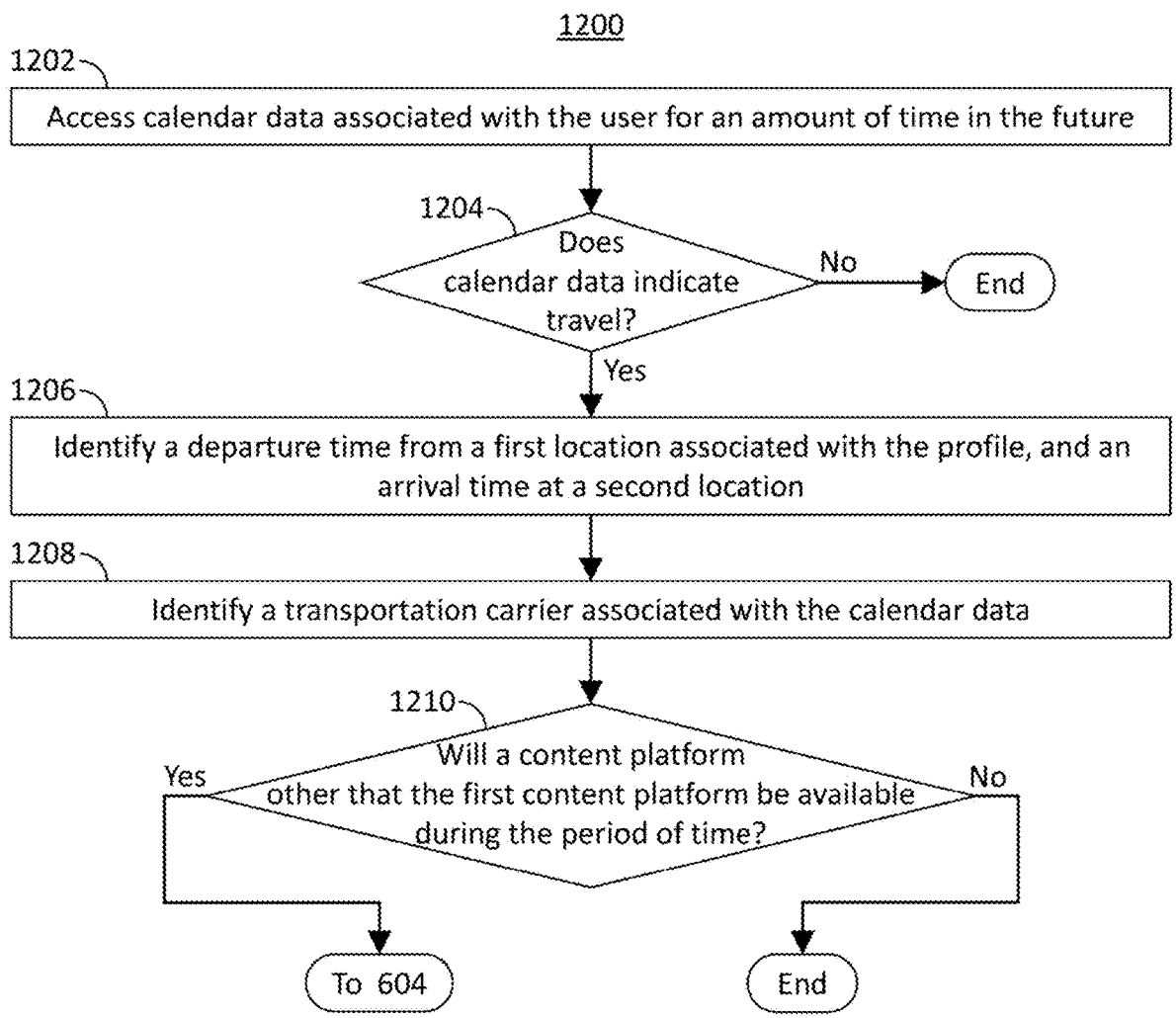
FIG. 12 is a flowchart representing a process for determining whether a second content platform will be available to a user in the near future, in accordance with some embodiments of the disclosure.

FIG. 12 is a flowchart representing an illustrative process 1200 for determining whether a second content platform will be available to a user in the near future, in accordance with some embodiments of the disclosure. Process 1200 may be implemented on control circuitry 504. In addition, one or more actions of process 1200 may be incorporated into or combined with one or more actions of any other process or embodiment described herein.

At 1202, control circuitry 504 accesses calendar data associated with a profile of the user for an amount of time in the future. For example, control circuitry 504 may access calendar data for the next seven days. Control circuitry 504 may transmit a query to the profile database 516 for calendar data for the next seven days. At 1204, control circuitry 504 determines whether the calendar data indicates travel. Control circuitry 504 processes calendar data to identify travel-related entries such as flights and hotel reservations.

If the calendar data indicates travel, then, at 1206, control circuitry 504 identifies a departure time from a first location associated with the profile and an arrival time at a second location associated with the travel. Control circuitry 504 determines from the travel-related entries a time at which the user will begin travelling, such as a flight departure time. Control circuitry 504 also determines when the user will arrive at his or her destination, such as a flight arrival time or a hotel check-in time.

At 1208, control circuitry 504 identifies, from the calendar data, a transportation carrier associated with the calendar data. Control circuitry 504 may identify an airline from the calendar data by performing a keyword search for known airline names such as "United Airlines," "JetBlue," "Lufthansa." Alternatively, control circuitry 504 may identify an airline from a carrier code included as part of a flight number. For example, flight number "B6 1701" corresponds to JetBlue flight 1701. Control circuitry 504 may access a database of known carrier codes based upon which control circuitry 504 may identify the carrier.

At 1210, control circuitry 504 determines whether a content platform other than the first content platform 100 will be available during the period of time. Control circuitry 504 transmits a query to, or otherwise accesses, a server associated with the identified carrier to determine whether a content platform will be available to the user during transit. If another content platform (i.e., second content platform 108) will be available during the period of time, then processing proceeds to step 604 (FIG. 6), where control circuitry 504 determines a duration of the period of time.

The actions and descriptions of FIG. 12 may be user with any other embodiment of this disclosure. In addition, the actions and descriptions described in relation to FIG. 12 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, by a first content platform that provides access to content items administered by a first provider, an access token from a second content platform administered by a second provider, wherein the access token enables access to the second content platform by the first content platform for retrieving content items from the second content platform;
   determining whether the second content platform corresponds to the second provider, wherein the second provider is different than the first provider;
   determining access parameters that comprise the access token, wherein at least one access parameter comprises calendar data indicating a start time and a duration that the second content platform is accessible via the first content platform;
   identifying a passenger transportation carrier associated with the calendar data;
   receiving updated calendar data that indicates either the start time or the duration, defined by the access parameters that comprise the access token, are changed;
   updating the access parameters that comprise the access token based on the updated calendar data; and
   modifying access to the second content platform by the first content platform based on an updated access token comprising the updated access parameters.

2. The method of claim 1, further comprising:
   comparing a duration of a content item, accessed by the first content platform via the second content platform, to an access duration defined by the access token; and
   determining, based on the comparing, whether the duration of the content item exceeds the access duration.

3. The method of claim 2, further comprising:
   in response to determining that the duration of the content item exceeds the access duration, generating for display an alert that the duration of the content item exceeds the access duration; and
   wherein generating for display the content item and reducing the access duration by the amount of time equal to the duration of the content item occur in response to determining that the duration of the content item does not exceed the access duration.

4. The method of claim 1, further comprising:
   dividing an access duration, defined by the access token, into a plurality of portions for a plurality of content types;
   identifying a content type of a content item, accessed by the first content platform via the second content platform; and
   reducing a portion of the access duration corresponding to the identified content type.

5. The method of claim 1, further comprising:
   adding a duration of a content item, accessed by the first content platform via the second content platform, to a length of content consumed via the first content platform;
   calculating a new remaining access duration representing a difference between an access duration defined by the access token and the duration of content consumed by the user; and
   replacing a remaining access duration with the new remaining access duration.

6. The method of claim 1, wherein the access token further comprises a temporary license to consume a content item, accessed by the first content platform via the second content platform, corresponding to a selected content identifier generated by the second content platform and accessible via the first content platform.

7. The method of claim 6, further comprising:
determining whether the content item corresponding to the selected content identifier is currently available on the first content platform; and
in response to determining that the content item corresponding to the selected content identifier is not currently available on the first content platform, reducing an access duration defined by the access token.

8. A method comprising:
receiving, by a first content platform that provides access to content items administered by a first provider, an access token from a second content platform administered by a second provider, wherein the access token enables access to the second content platform by the first content platform for retrieving content items from the second content platform;
determining whether the second content platform corresponds to the second provider, wherein the second provider is different than the first provider;
determining access parameters that comprise the access token, wherein at least one access parameter comprises calendar data indicating a start time and a duration that the second content platform is accessible via the first content platform;
identifying a passenger transportation carrier associated with the calendar data receiving updated calendar data that indicates either the start time or the duration, defined by the access parameters that comprise the access token, are changed;
updating the access parameters that comprise the access token based on the updated calendar data;
modifying access to the second content platform by the first content platform based on an updated access token comprising the updated access parameters;
identifying, by the first content platform, a plurality of content items that will be available on the second content platform during an access period defined by the access token;
determining whether each respective content item is currently available on the first content platform; and
in response to determining that a respective content item is not currently available on the first content platform, retrieving a content identifier of the respective content item.

9. The method of claim 8, further comprising:
modifying an interface corresponding to the first content platform to include content identifiers retrieved from the second content platform.

10. A system comprising:
input/output circuitry configured to:
receive, by a first content platform that provides access to content items administered by a first provider, an access token from a second content platform administered by a second provider, wherein the access token enables access to the second content platform by the first content platform for retrieving content items from the second content platform; and
control circuitry configured to:
determine whether the second content platform corresponds to the second provider, wherein the second provider is different than the first provider;
determine access parameters that comprise the access token, wherein at least one access parameter comprises calendar data indicating a start time and a duration that the second content platform is accessible via the first content platform;
identify a passenger transportation carrier associated with the calendar data;
receive updated calendar data that indicates either the start time or the duration, defined by the access parameters that comprise the access token, are changed;
update the access parameters that comprise the access token based on the updated calendar data; and
modify access to the second content platform by the first content platform based on an updated access token comprising the updated access parameters.

11. The system of claim 10, wherein the control circuitry is further configured to:
compare a duration of a content item, accessed by the first content platform via the second content platform, to an access duration defined by the access token; and
determine, based on the comparing, whether the duration of the content item exceeds the access duration.

12. The system of claim 11, wherein the control circuitry is further configured to:
in response to determining that the duration of the content item exceeds the access duration, generate for display an alert that the duration of the content item exceeds the access duration; and
wherein the control circuitry is further configured to generate for display the content item and reduce the access duration by the amount of time equal to the duration of the content item occur in response to determining that the duration of the content item does not exceed the access duration.

13. The system of claim 10, wherein the control circuitry is further configured to:
divide an access duration, defined by the access token, into a plurality of portions for a plurality of content types;
identify a content type of a content item, accessed by the first content platform via the second content platform; and
reduce a portion of the access duration corresponding to the identified content type.

14. The system of claim 10, wherein the control circuitry is further configured to:
add a duration of a content item, accessed by the first content platform via the second content platform, to a length of content consumed via the first content platform;
calculate a new remaining access duration representing a difference between an access duration defined by the access token and the duration of content consumed by the user; and
replace a remaining access duration with the new remaining access duration.

15. The system of claim 10, wherein the control circuitry configured to receive the access token is further configured to determine the access token further comprises a temporary license to consume a content item, accessed by the first content platform via the second content platform, corresponding to a selected content identifier generated by the second content platform and accessible via the first content platform.

16. The system of claim 15, wherein the control circuitry is further configured to:
determine whether the content item corresponding to the selected content identifier is currently available on the first content platform; and in response to determining that the content item corresponding to the selected content identifier is not currently available on the first content platform, reduce an access duration defined by the access token.

17. The system of claim 10, wherein the control circuitry is further configured to:
   identify, by the first content platform, a plurality of content items that will be available on the second content platform during an access period defined by the access token;
   determine whether each respective content item is currently available on the first content platform; and
   in response to determining that a respective content item is not currently available on the first content platform, retrieve a content identifier of the respective content item.

18. The system of claim 17, wherein the control circuitry is further configured to:
   modify an interface corresponding to the first content platform to include content identifiers retrieved from the second content platform.

* * * * *